United States Patent [19]
Takagi et al.

[11] Patent Number: 5,338,713
[45] Date of Patent: Aug. 16, 1994

[54] SINTERED BODY OF ALUMINA AND PARTIALLY STABILIZED ZIRCONIA, A PROCESS FOR MAKING THE SAME AND A METHOD OF PREPARING A POWDER FOR SINTERING

[75] Inventors: Hiroyoshi Takagi, Kasugai; Masanobu Awano, Nagoya; Yuzi Hoshi, Funabashi, all of Japan

[73] Assignees: Agency of Industrial Science and Technology; Nissan Chemical Industries Ltd., both of Tokyo, Japan

[21] Appl. No.: 66,654

[22] Filed: May 25, 1993

Related U.S. Application Data

[63] Continuation of Ser. No. 927,890, Aug. 11, 1992, abandoned, which is a continuation of Ser. No. 532,634, Jun. 4, 1990, abandoned.

[30] Foreign Application Priority Data

Jun. 8, 1989 [JP] Japan .................................. 1-146102

[51] Int. Cl.$^5$ .............................................. C04B 35/48
[52] U.S. Cl. ..................................... 501/105; 501/103
[58] Field of Search ........................ 501/103, 104, 105

[56] References Cited

U.S. PATENT DOCUMENTS

| | | | |
|---|---|---|---|
| 4,587,225 | 5/1986 | Tsukuma et al. | 501/104 X |
| 4,626,517 | 12/1986 | Watanabe et al. | 501/104 X |
| 4,814,915 | 3/1989 | Wada et al. | 501/105 X |

FOREIGN PATENT DOCUMENTS

| | | |
|---|---|---|
| 0236507 | 9/1986 | European Pat. Off. |
| 0204327 | 12/1986 | European Pat. Off. |
| 0291029 | 11/1988 | European Pat. Off. |
| 0294844 | 12/1988 | European Pat. Off. |

*Primary Examiner*—Mark L. Bell
*Assistant Examiner*—Deborah Jones
*Attorney, Agent, or Firm*—Oliff & Berridge

[57] ABSTRACT

A powder for sintering is prepared by the wet mixing of a finely and uniformly divided alumina powder of high purity having a primary particle diameter not exceeding 0.15 micron and an average particle diameter not exceeding 0.3 micron, and a partially stabilized zirconia powder of high purity having an average particle diameter not exceeding 0.3 micron. After granulation and molding, the mixed powder is sintered at a temperature of 1300° C. to 1500° C. to make a sintered body having an average grain size not exceeding 0.7 micron.

5 Claims, 1 Drawing Sheet

SINTERED BODY OF ALUMINA AND PARTIALLY STABILIZED ZIRCONIA, A PROCESS FOR MAKING THE SAME AND A METHOD OF PREPARING A POWDER FOR SINTERING

This is a continuation of application Ser. No. 07/927,890 filed Aug. 11, 1992, now abandoned, which in turn is a continuation of application Ser. No. 07/532,634 filed Jun. 4, 1990, now abandoned.

BACKGROUND OF THE INVENTION

1. Field of the Invention

This invention relates to a sintered body of alumina and partially stabilized zirconia (hereeinafter referred to as "PSZ"), a process for making such a sintered body and a method of preparing a powder.

2. Description of the Prior Art

A ceramic material comprising particles of alumina as a matrix and PSZ dispersed therein is expected to be of great use as a structural material because of its high toughness, bending strength, hardness, and wear resistance. This material is mainly manufactured by vapor phase reaction, coprecipitation, or the wet mixing of powders in a ball mill.

The powder produced by vapor phase reaction or coprecipitation is, however, composed of particles which are so fine and active as to agglomerate easily, though it can be sintered at a temperature which is as low as from 1300° C. to 1500° C. Moreover, both of vapor phase reaction and coprecipitation involve a complicated process and the product thereof is, therefore, expensive.

The wet mixing of powders is, on the other hand, a simple and inexpensive process. It, however, calls for a long time and, therefore, lacks efficiency. Moreover, the mixture requires a sintering temperature which is as high as from 1500° C. to 1700° C. For example, Japanese Patent Application laid open under No. 190259/1984 states that a temperature of 1500° C. to 1700° C. is preferable for sintering a material comprising an alumina matrix and PSZ dispersed therein, and Japanese Patent Application laid open under No. 288157/1987 describes an example in which a temperature of 1600° C. was employed.

No sintered product having a high bending strength has hitherto been obtained unless its sintering is carried out at elevated pressure. For example, Japanese Patent Application laid open under No. 6126/1986 discloses a sintered product of a powder prepared by a vapor phase reaction, but it has a bending strength of only 78 kg/mm². Japanese Patent Application laid open under No. 103859/1988 discloses a sintered product prepared from a mixture of alumina slurry and PSZ slurry but it has a bending strength of only 62 kg/mm². The sintered composite of alumina and PSZ appearing in the Daily Industrial News (Japanese newspaper) of Dec. 6, 1989 has only a bending strength not exceeding 80 kg/mm².

A high-pressure sintering process using, for example, a HIP (hot isostatic press) or a hot press has hitherto been employed for making a densely sintered product having fine grain size and high strength. An abnormal grain growth is likely to occur in a powder containing a large amount of impurities as a result of the formation of an amorphous phase at the grain boundary, or a liquid phase during its sintering. In either event, the abnormal grain growth results in a sintered product having low strength.

According to a first aspect of this invention, there is provided a sintered body comprising alumina and partially stabilized zirconia, and having an average grain size diameter not exceeding 0.7 micron.

According to a second aspect of this invention, there is provided a process for making a sintered body of alumina and PSZ which comprises preparing a wet mixture of a finely divided alumina powder of high purity having a primary particle diameter not exceeding 0.15 micron and an average particle diameter not exceeding 0.3 micron, and a partially stabilized zirconia powder of high purity having an average particle diameter not exceeding 0.3 micron, molding the mixed powder, and sintering the molded product at a temperature of 1300°–1500° C.

According to a third aspect of this invention, there is provided a method of preparing a sintering powder by the wet mixing of alumina and PSZ powders which comprises using a finely divided alumina powder of high purity having a primary particle diameter not exceeding 0.15 micron and an average particle diameter not exceeding 0.3 micron, and a PSZ powder of high purity having an average particle diameter not exceeding 0.3 micron.

These and other features and advantages of this invention will become more apparent from the following description and the accompanying drawing.

DETAILED DESCRIPTION OF THE INVENTION

Figure 1:
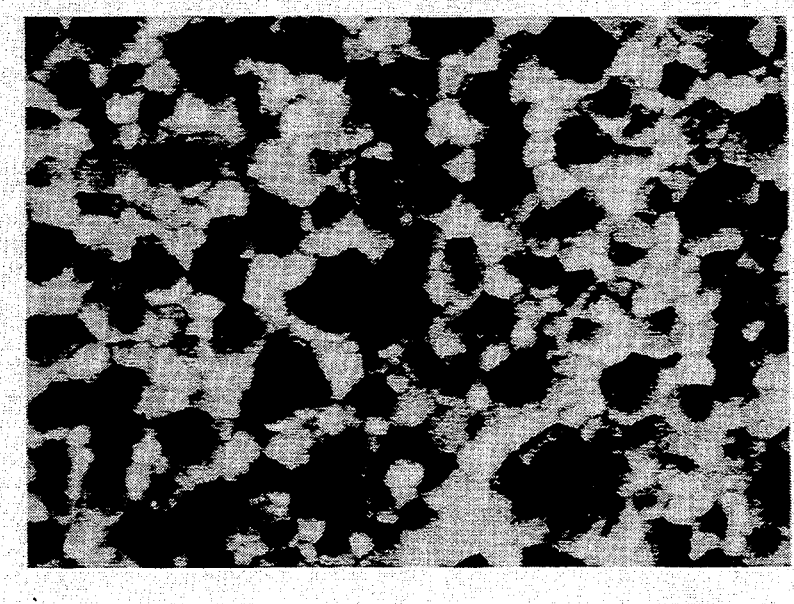
FIG. 1 is a photograph taken through a scanning electron microscope and showing at a magnification of 20,000 the microstructure of a sintered body of alumina and PSZ as obtained in EXAMPLE 7 of this invention which will hereinafter be described.

According to a salient feature of this invention, a powder for sintering is prepared by using a finely divided alumina powder having a primary particle diameter not exceeding 0.15 micron and an average particle diameter not exceeding 0.3 micron, and a purity of at least 99.95%, and a PSZ powder having an average particle diameter not exceeding 0.3 micron, and a purity of at least 99.95%. The fine PSZ powder having a purity of at least 99.5% contains only less than 0.05% of impurities other than a partial stabilizer and hafnia. Although any PSZ of the type known in the art may be used for the purpose of this invention, it is preferable to use one containing 0.5 to 5%, and more preferably 2 to 3.5%, of yttria on a mol percent basis.

The mixed powder of alumina and PSZ can be prepared by an ordinary wet mixing method using water, or an organic solvent such as alcohol. Although any known type of mixer can be used, it is preferable to use an attrition mill (e.g., an Attritor made by Mitsui Miike Kakoki, a Japanese company), as it can form a uniform mixture in a short time. The use of a ball and a vessel which are both made of high-purity alumina or PSZ is strongly recommended to prevent the inclusion of impurities in the mixed powder. No long time of mixing is necessary. If an attrition mill is used, it is sufficient to continue mixing for a period of three to 30 hours, depending on the concentration of the powders in the solvent and the rotating speed of the mill. Too long a time of mixing must be avoided, as the particles are so finely divided as to agglomerate again.

The proportions of alumina and PSZ in the mixed powder depend on the sintered product which is to be manufactured. A generally preferable proportion of PSZ is, however, in the range of 10 to 50% by volume. A mixed powder containing a higher proportion of alumina yields a sintered body having a higher hardness.

The proportion by volume of PSZ as hereinabove stated has been determined on the premises that PSZ has a density of 6 g/cm$^3$, while alumina has a density of 4 g/cm$^3$. Therefore a mixed powder containing, for example, 40% by volume of PSZ is one containing 50% by weight of PSZ. The proportions by volume of alumina and zirconia in a sintered product are substantially equal to their proportions in the mixed powder.

The wet mixing of alumina and PSZ powders gives a slurry of their mixture. A mixed powder is obtained if the slurry is dried by an ordinary method, for example, by heating to a temperature in the vicinity of the boiling point of the solvent.

The dry powder can be used to make a sintered body of alumina and PSZ by employing a process including the usual steps of granulation, molding and sintering. The powder can be sintered at normal pressure, i.e. without any positive application of pressure, as it consists of finely and uniformly divided particles, though it can, of course, be sintered at an elevated pressure by employing, for example, a HIP, or hot press. It is preferably sintered at a temperature of 1300° C. to 1500° C. The use of any temperature exceeding 1500° C. is undesirable, as it causes the grain growth of alumina resulting in a sintered product of low strength.

The sintered body of alumina and PSZ according to this invention is a novel fine-grained product of high density having an average grain size not exceeding 0.7 micron. It has a bulk density of at least 98% of theoretical density, a Vickers hardness of at least 1500 kg/mm$^2$, and a bending strength of at least 100 kg/mm$^2$.

The average grain size of the sintered body was determined by polishing a surface of the body to give it a mirror finish, etching the polished surface, examining the etched surface through a scanning electron microscope, and making the following calculation:

$$r = 1.5 L$$

where r is the average grain size and L is the average length of at least 50 grains lying across a line drawn arbitrarily on the examined surface.

The invention will now be described in further detail with reference to several specific examples. It is, however, to be understood that these examples are not intended for limiting the scope of this invention.

EXAMPLE 1

An attritor was charged with a finely and uniformly divided alumina powder having a primary particle diameter of 0.1 micron measured by SEM, an average particle diameter of 0.2 micron by sedimentation method and a purity of 99.99% (product of Taimei Chemical Co. Ltd.) and a PSZ powder having an average particle diameter of 0.2 micron and a purity of 99.98% and containing 3% of yttria on a mol percent basis (product of Nissan Chemical Industries, Ltd.), the proportion of the PSZ being 40% by volume. The balls in the attritor had a diameter of 3 mm and were made of high-purity PSZ. Ethanol was used as a dispersion medium and the powders were mixed together for three hours to form a slurry containing 40% by weight of their mixture. After it had been dried, the mixed powder was molded isostatically at a pressure of 2.6 tons/cm$^2$ and the molded product was sintered at a temperature of 1450° C. and normal pressure for two hours in the air.

The sintered product was examined for bulk density, three-point bending strength and Vickers hardness. Its bulk density was determined by Archimedes' method. Its three-point bending strength was determined in accordance with the JIS R-1601-1981 method. Its Vickers hardness was determined by polishing a specimen after its bending test to a mirror finish with a diamond paste, and applying a load of 1 kg to it. It showed a bulk density of 4.78 g/cm$^3$, and average three-point bending strength of 103 kg/mm$^2$ with a maximum of 115 kg/mm$^2$, and a Vickers hardness of 1577 kg/mm$^2$.

EXAMPLES 2 TO 9

Sintered products were made by using different proportions of alumina and PSZ powders, PSZ powders having different compositions, and different mixing conditions, as shown in TABLE 1, but otherwise repeating EXAMPLE 1. The procedures of EXAMPLE 1 were followed for determining the bulk density, three-point bending strength and Vickers hardness of each product. The results are shown in TABLE 1, and confirm the high strength and hardness of the sintered products according to this invention.

The microstructure of the product of EXAMPLE 7 was examined through a scanning electron microscope. FIG. 1 is a photograph showing it at a magnification of 20,000. Black grains are of alumina, and white ones of PSZ.

TABLE 1

| | Composition of mixed powder, vol. % | | Composition of ZrO$_2$ powder, mol % | | Mixing time, h | Bulk density, g/cm$^3$ | Average grain size μm | Bending strength, kg/mm$^2$ | | Vickers hardness, kg/mm$^2$ |
|---|---|---|---|---|---|---|---|---|---|---|
| | Al$_2$O$_3$ | ZrO$_2$ | Y$_2$O$_3$ | ZrO$_2$ | | | | Average | Maximum | |
| Example 1 | 60 | 40 | 3.0 | 97.0 | 3 | 4.79 | 0.40 | 103 | 115 | 1577 |
| Example 2 | 80 | 20 | 3.0 | 97.0 | 3 | 4.38 | 0.45 | 89 | 105 | 1750 |
| Example 3 | 70 | 30 | 3.0 | 97.0 | 3 | 4.60 | 0.45 | 87 | 102 | 1640 |
| Example 4 | 50 | 50 | 3.0 | 97.0 | 3 | 5.00 | 0.40 | 93 | 106 | 1540 |
| Example 5 | 80 | 20 | 2.5 | 97.5 | 3 | 4.35 | 0.50 | 97 | 103 | 1754 |
| Example 6 | 70 | 30 | 2.5 | 97.5 | 3 | 4.60 | 0.50 | 112 | 120 | 1692 |
| Example 7 | 60 | 40 | 2.5 | 97.5 | 3 | 4.78 | 0.45 | 107 | 116 | 1608 |
| Example 8 | 50 | 50 | 2.5 | 97.5 | 3 | 5.00 | 0.40 | 105 | 120 | 1556 |
| Example 9 | 60 | 40 | 3.0 | 97.0 | 30 | 4.79 | 0.40 | 106 | 124 | 1570 |

What is claimed is:

1. A sintered body comprised of alumina and partially stabilized zirconia and having an average grain size diameter not exceeding 0.7 micron obtained by the process comprising:

preparing a wet mixture of a uniformly divided alumina powder of at least 99.95% purity having a primary particle diameter not exceeding 0.15 micron and an average particle diameter greater than 0.1 micron and not greater than 0.3 micron, and 10 to 50% by volume of a partially stabilized zirconia powder of at least 99.95% purity having an average particle diameter not exceeding 0.3 micron, molding the mixture, and sintering the molded product at a temperature of 1300° to 1500° C. at atmospheric pressure.

2. In a method of preparing a powder for sintering by the wet mixing of alumina and partially stabilized zirconia powders, the improvement which comprises mixing a finely and uniformly divided alumina powder of at least 99.95% purity having a primary particle diameter not exceeding 0.15 micron and an average particle diameter greater than 0.1 micron and not greater than 0.3 micron and 10 to 50% by volume of a partially stabilized zirconia powder of at least 99.95% purity having an average particle diameter not exceeding 0.3 micron.

3. A method as set forth in claim 2, wherein said partially stabilized zirconia powder contains 0.5 to 5% of yttria on a mol percent basis.

4. In a process for making a sintered body of alumina and partially stabilized zirconia including the steps of preparing a powder for sintering by the wet mixing of alumina and partially stabilized zirconia powders, granulating said powder to obtain a product, molding the granulated product, and sintering the molded product, wherein said powder for sintering is prepared by mixing a finely and uniformly divided alumina powder of at least 99.95% purity having a primary particle diameter not exceeding 0.15 micron and an average particle diameter greater than 0.1 micron and not greater than 0.3 micron and 10 to 50% by volume of a partially stabilized zirconia powder of at least 99.95% purity having an average particle diameter not exceeding 0.3 micron and said sintering is carried out by heating at a temperature of 1300° to 1500° C. at atmospheric pressure.

5. A process as set forth in claim 4, wherein said partially stabilized zirconia powder contains 0.5 to 5% of yttria on a mol percent basis.

* * * * *